(12) United States Patent
Birkigt et al.

(10) Patent No.: US 6,422,799 B1
(45) Date of Patent: Jul. 23, 2002

(54) OVERHEAD TRANSPORT SYSTEM

(75) Inventors: Reinhard Birkigt, Herdecke; Gerhard Kroll, Witten, both of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/465,197

(22) Filed: Dec. 15, 1999

(30) Foreign Application Priority Data

Jan. 5, 1999 (DE) ........................................ 199 00 688

(51) Int. Cl.[7] .......................... B66C 17/00; B65G 1/00; E04H 6/00
(52) U.S. Cl. ................. 414/281; 212/312; 414/234; 414/264; 414/266
(58) Field of Search ................... 212/312, 314–316; 414/234, 239, 264, 262, 231, 240, 284, 246, 266, 281

(56) References Cited

U.S. PATENT DOCUMENTS

| | | | | |
|---|---|---|---|---|
| 2,598,756 A | * | 6/1952 | Bargehr | 414/262 |
| 2,755,941 A | * | 7/1956 | Orr | 414/234 |
| 3,833,140 A | | 9/1974 | Young et al. | |
| 4,395,186 A | * | 7/1983 | Magnotte | 212/314 |
| 5,449,261 A | * | 9/1995 | Rossato | 414/234 |

FOREIGN PATENT DOCUMENTS

| | | | | |
|---|---|---|---|---|
| AT | 243692 | * | 11/1965 | 414/239 |
| EP | 0 154 667 A1 | | 9/1985 | |
| FR | 1536359 | * | 7/1967 | 414/239 |

* cited by examiner

Primary Examiner—Eileen D. Lillis
Assistant Examiner—R. B. Johnson
(74) Attorney, Agent, or Firm—Henry M. Feiereisen

(57) ABSTRACT

A overhead transport system with load-bearing members, in particular transverse bars for attachment of loads, includes running rails which extend in at least two horizontal planes in spaced-apart, parallel disposition, and at least one crane which travels in an upper one of the planes transversely to the running rails for transfer of the load-bearing members from one running rail to another running rail. In order to provide the overhead transport system in a cost-efficient manner with two production or treatment planes while yet saving time as far as transfer of the load-bearing members is concerned, the transfer of the load-bearing members in a lower one of the planes is realized by at least one self-propelled transfer vehicle which travels transversely to the running rails.

7 Claims, 6 Drawing Sheets

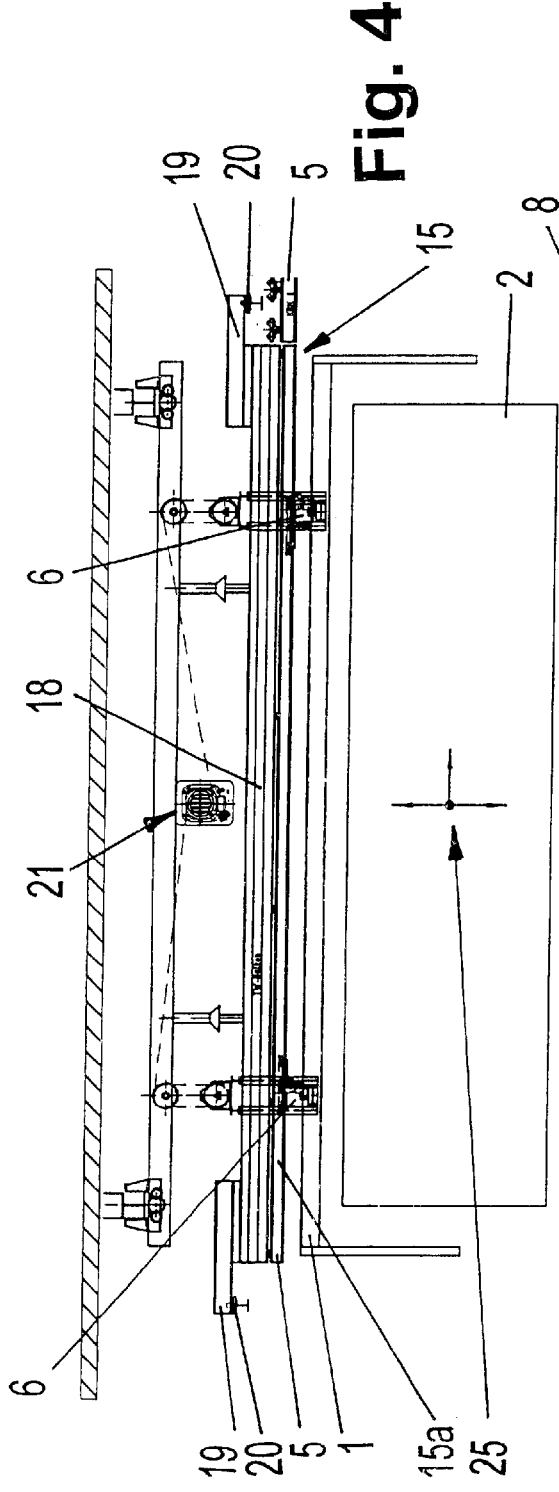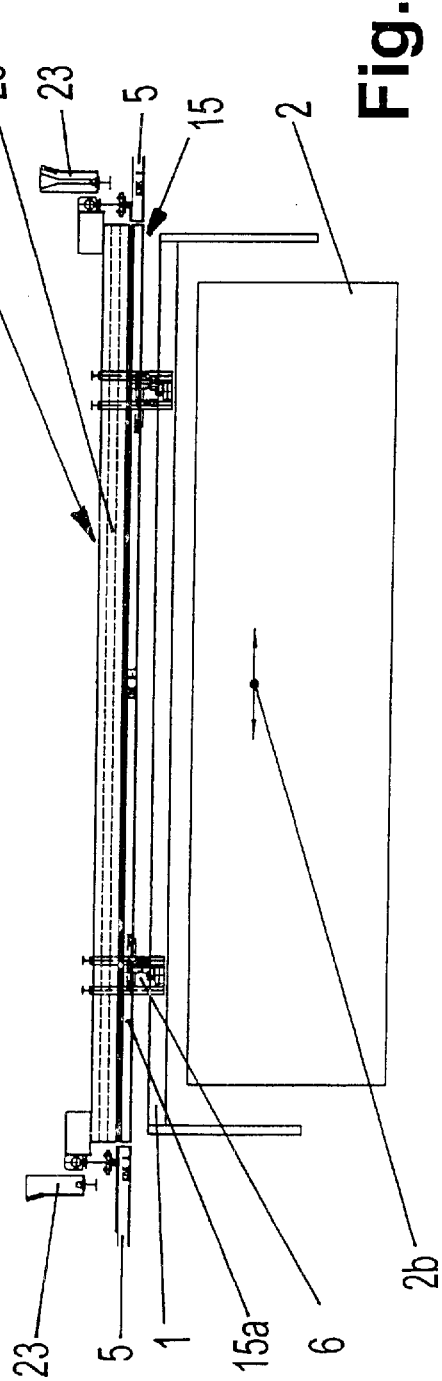

OVERHEAD TRANSPORT SYSTEM

CROSS-REFERENCES TO RELATED APPLICATIONS

This application claims the priority of German Patent Application Serial No. 199 00 688, filed Jan. 5, 1999, subject matter of which is incorporated herein by reference.

BACKGROUND OF THE INVENTION

The present invention relates, in general, to an overhead transport system for moving loads, and more particularly to a transport system of a type including load-bearing members which travel along running rails extending at least in two horizontal planes in spaced-apart parallel disposition, and a crane which travels in an upper one of the planes transversely to the running rails for transfer of the load-bearing members from one running rail to another running rail.

It is known from the magazine "Materialfluss", April 1982, pages 31–34, to provide a crane assembly with several production planes. A transfer of loads is normally realized by several cranes whereby the loads are suspended from load-bearing members which are provided with running gears. The cranes travel in the upper plane transversely to the running rails and are designed to transfer load-bearing members from a running rail of one plane to a running rail of another plane. In addition to the transfer of the load-bearing members in vertical direction, the cranes also carry out a transfer of load-bearing members between running rails in a same plane. This type of crane assembly suffers shortcomings because a time-efficient operation of the transfer procedures requires the use of several cranes. As a consequence, the overall costs are relatively high; yet the provision of several cranes still fails to effectively reduce the time for carrying out the transfer procedures as cranes of this type are slow in operation.

SUMMARY OF THE INVENTION

It is thus an object of the present invention to provide an improved overhead transport system, obviating the aforestated drawbacks.

In particular, it is an object of the present invention to provide an improved overhead transport system which includes at least two production planes in a cost-efficient manner while still being able to effectively reduce the overall transfer times.

These objects, and others which will become apparent hereinafter, are attained in accordance with the present invention by providing a first rail system positioned in a horizontal plane and including running rails for travel of load-bearing members; a second rail system located in a horizontal plane in parallel, spaced-apart disposition to the first rail system and including running rails for travel of load-bearing members; a crane traveling in an upper one of the planes of the first and second rail systems in a transverse direction to the running rails for transferring the load-bearing members from one of the running rails to another one of the running rail; and a self-propelled transfer vehicle traveling in a lower one of the planes of the first and second rail systems in a direction transversely to the running rails for transferring load-bearing members in the lower one of the planes.

Through the provision of a separate, self-propelled transfer vehicle, the transfer of load-bearing members in the lower one of, for example, two vertically spaced planes does no longer require the use of a crane but is assumed by the much more agile transfer vehicle which is of much simpler structure than the crane, and attain a reduction of transfer times. The crane is thus used primarily used for transfers in the upper plane and for transfers between the upper and lower planes.

The time for transfer of a load-bearing member from and to a running rail can be kept brief, when providing rail elements which are shiftable for alignment with ends of the running rails for receiving at least one load-bearing member from one running rail and transfer thereof to another running rail, with the rail elements being shiftable together with the one load-bearing member. Thus, the load-bearing members travel, for example, from one running rail onto the rail element of the transfer vehicle and can be placed into alignment with another running rail to enable the load-bearing member to travel from the rail element to this running rail. Suitably, at least one of the rail elements is arranged on the transfer vehicle. Thus, the transfer vehicle can then move he desired running rail in position for receiving or transfer of at least one load-bearing member.

According to another feature of the present invention, the transfer vehicle can self-propel to a position adjacent a desired end of the running rail for connection of the rail element with the respective running rail, so that short transfer periods are attained in the respective plane with the transfer vehicle. The time for travel as well as for precise positioning can thereby be kept small.

In a simple configuration, the rail element may be a running rail portion for support and guidance of the load-bearing member. This results in a cost-efficient design, as the running gears can be precisely matched to the shape and size of these running rails. Suitably, the running rail portion is designed rectilinear.

According to another feature of the present invention, the transfer vehicle may include two rail elements in parallel, spaced-apart disposition. This configuration is suitable when long travel paths are involved, as two running rails may be used simultaneously, or the same running rail can be used successively for reducing the travel time.

Suitably, the stability of the rail element can be increased by arranging each running rail on a support beam. The support beam is of massive configuration so that the overall system of support beam-rail element can be supported on both ends of the support beam. A transfer of the rail element by the crane can suitably realized together with the support beam in a same plane or from one plane to another plane. A precise positioning, in particular during placement of a support beam by the crane into the lower plane, can be realized by providing two funnel-shaped receptacles in which both ends of the support beam automatically position themselves.

According to another aspect of the present invention, the load-bearing members are provided with running gears to permit the load-bearing members to self-propel themselves onto the rail element. This may be carried out immediately after connection of the running rails, so as to secure also in this case short transfer times. It is, however, also possible to pull the load-bearing member onto the running rail or to push the load-bearing member from the running rail. This is advantageous because transport assignments can be separated from one another.

According to another aspect of the present invention, the transfer vehicle and/or the crane travel in a corridor, with the running rails being arranged in at least one of the planes at either side of the corridor in a direction transversely to the longitudinal axis of the corridor. As a result continuous running rails are realized during traverse of the transfer vehicle so that aligned running rails, separated only by the corridor, are temporarily connected for through-passage for a load-bearing member.

BRIEF DESCRIPTION OF THE DRAWING

The above and other objects, features and advantages of the present invention will be more readily apparent upon reading the following description of a preferred exemplified embodiment of the invention with reference to the accompanying drawing, in which:

FIG. 4 is a schematic illustration, on an enlarged scale, of a crane used in the overhead transport system of FIG. 1;

FIG. 4a is a schematic illustration, on an enlarged scale, of a transfer vehicle used in the overhead transport system of FIG. 1;

DETAILED DESCRIPTION OF PREFERRED EMBODIMENTS

Figure 1:
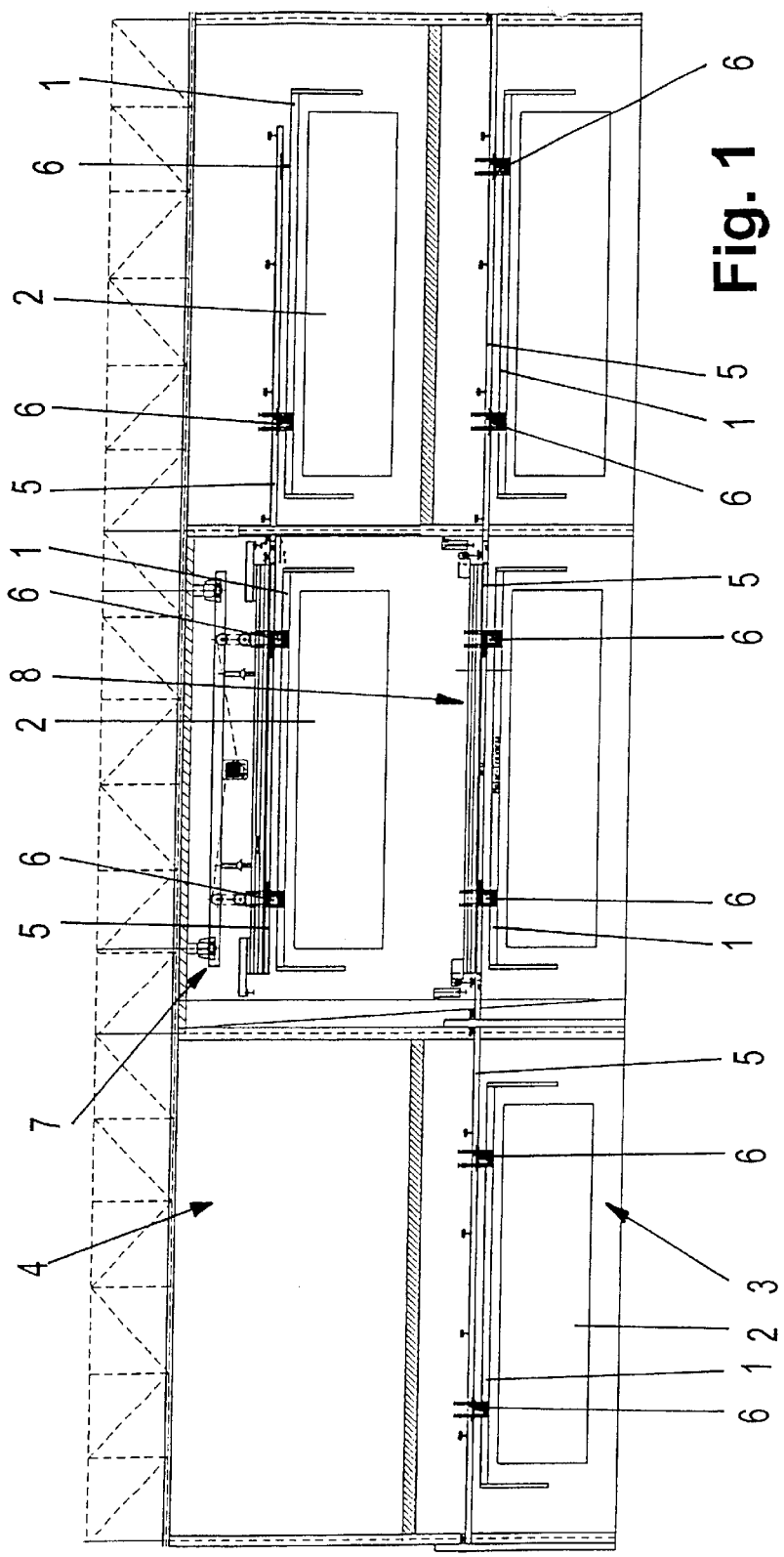
FIG. 1 is a schematic illustration of an overhead transport system in accordance with the present invention.

Throughout all the Figures, same or corresponding elements are generally indicated by same reference numerals.

Turning now to the drawing, and in particular to FIG. 1, there is shown a schematic illustration of an overhead transport system in accordance with the present invention, including load-bearing members 1 in the form of traverse bars from which loads 2, schematically illustrated here, are suspended. In the non-limiting example, involved here, the overhead transport system has two horizontal production planes 3, 4 which extend above one another in spaced-apart relation. Each production plane 3, 4 has running rails 5 along which the load-bearing members 1 travel via self-powered running gears 6 which have attached thereon the traverse bars of the load-bearing members 1. The running rails 5 may be formed as profiled hollow rails along which rollers, schematically illustrated in FIGS. 2 and 3 and denoted by reference numeral 6a, of the running gears 6 roll. The running rails 5 of the upper and lower production planes 3, 4 extend horizontally at vertical distance from one another. Persons skilled in the art will appreciate that it is also conceivable to combine the load-bearing members 1 with a suitable device by which the load-bearing members 1 can be pulled onto or pushed from the running rail.

Figure 2:
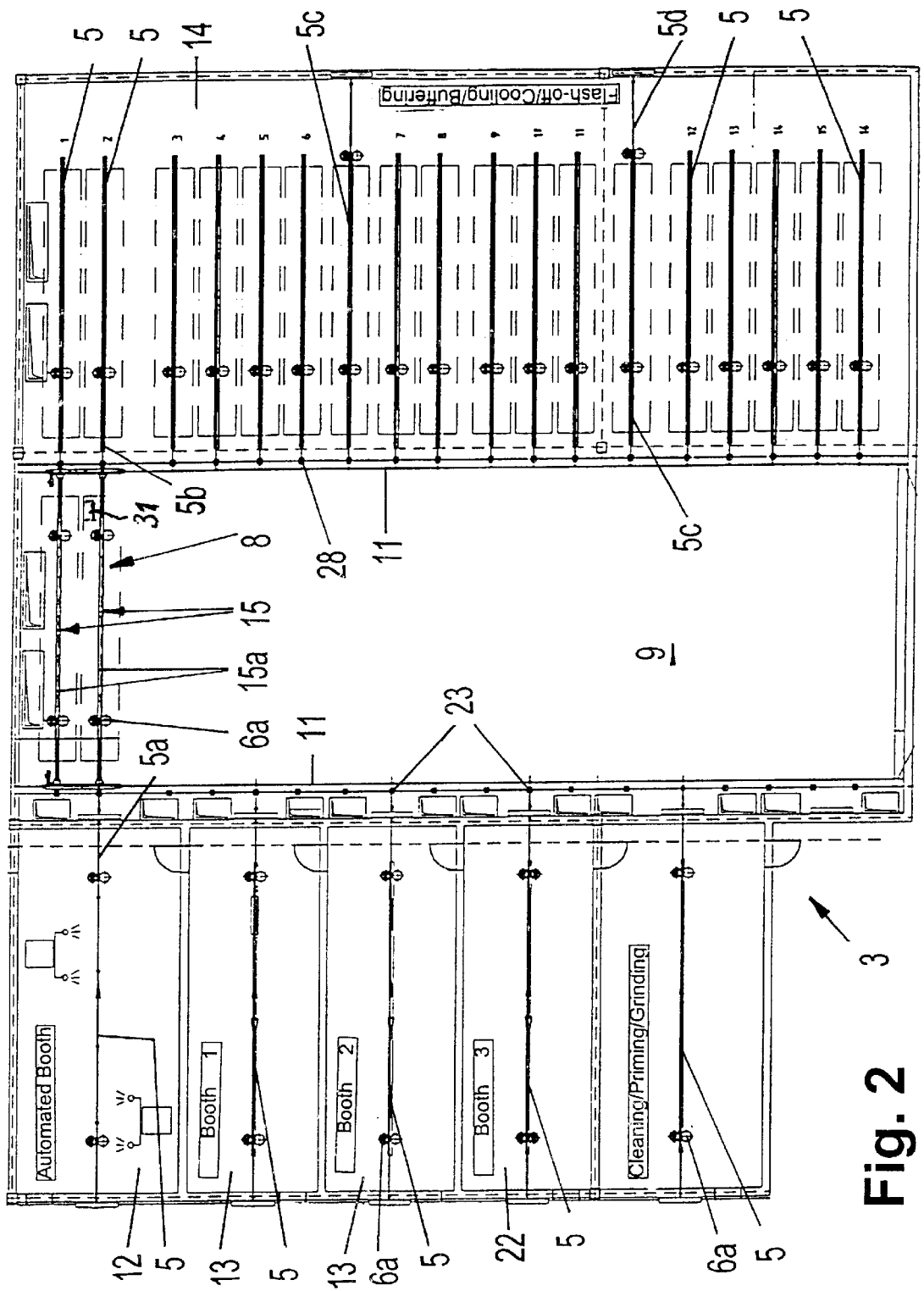
FIG. 2 is a plan view of a lower production plane of the overhead transport system of FIG. 1.
Figure 3:
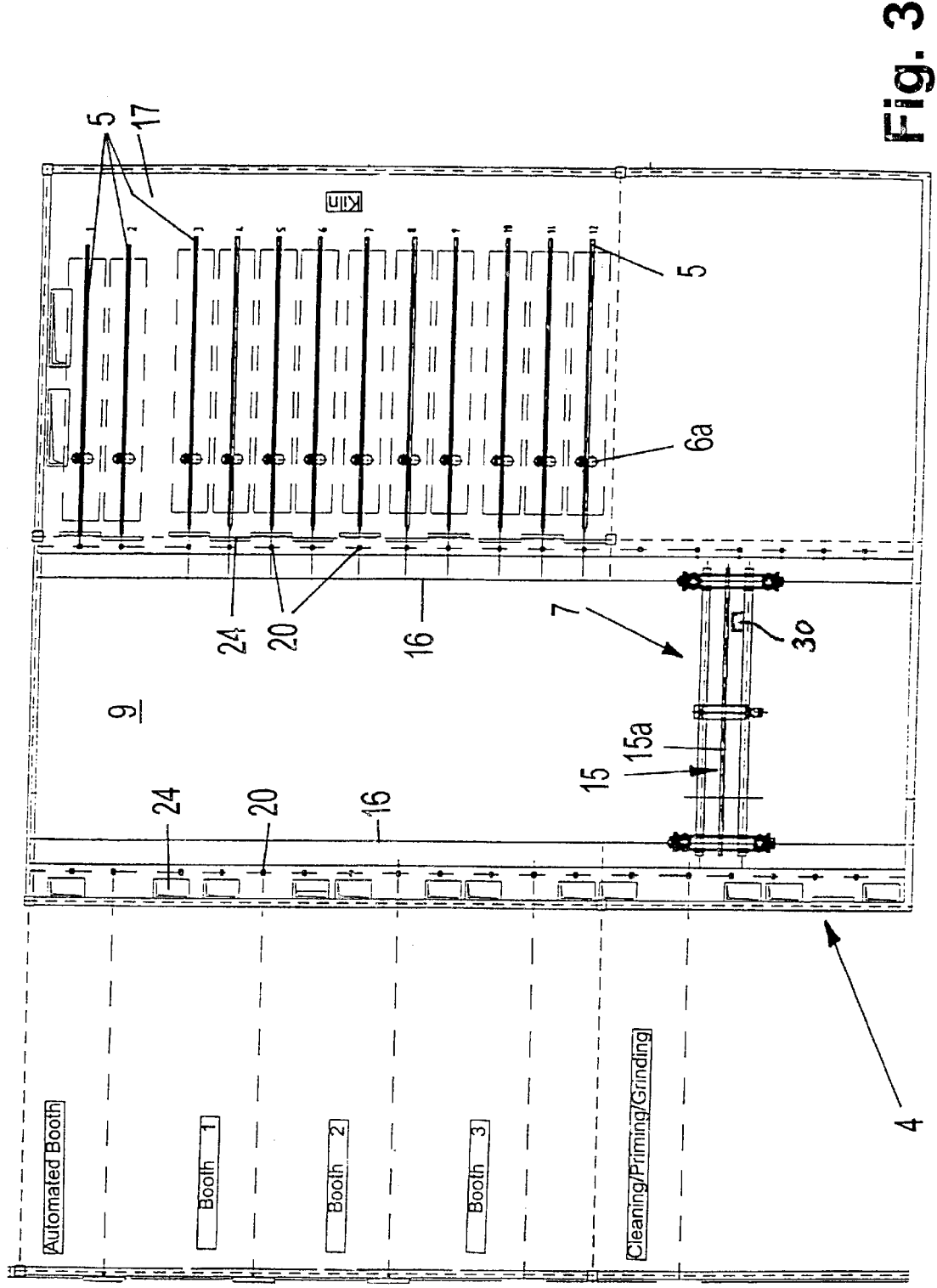
FIG. 3 is a plan view of an upper production plane of the overhead transport system of FIG. 1.

In a mid-section thereof, the overhead transport system includes in the upper plane 4 a suspended crane 7, which may also be configured as transport carriage with crane-inherent functionality through provision of a conventional drive 30, symbolically shown in FIG. 3 by broken line, and in the lower production plane 3 a self-propelled transfer vehicle 8 including a conventional drive 31 symbolically shown in FIG. 2 by broken line. Both, the crane 7 and the transfer vehicle 8 travel transversely to the running rails 5 of the production planes 3, 4. As shown in FIG. 2, which is a plan view of the lower production plane 3 of the overhead transport system of FIG. 1, the running rails 5 extend in a common plane on both sides of a corridor 9 in parallel relation. Demarcating the corridor 9 are rails 11 which extend perpendicular to the running rails 5 for travel of the transfer vehicle 8 in a direction transversely to the running rails 5. Thus, the lower production plane 3 is separated by the corridor 9 into two zones, with one zone, shown on the left-hand side of FIG. 2, including several separate booths 12, 13, 22 for processing loads 2, for example metal sheets, machine parts or other workpieces, transported by the load-bearing members 1. Reference numeral 12 may constitute, for example, an automated booth 12 for automatic spray painting of the workpieces, reference numeral 13 may refer to manually-operated booths in which the workpieces are manually re-painted, and reference numeral 22 may refer to a booth in which the workpieces are finished by cleansing, priming and/or grinding. The other zone of the lower production plane 3, shown to the right of the corridor 9 in FIG. 2, may include a flash-off chamber 14 in which the workpieces can also cool down and can be buffered. The flash-off chamber 14 includes a plurality of parallel running rails which are numbered consecutively to the right thereof, with running rails 5c being extended with exit rails 5d for discharge of load-bearing members 1.

The transfer vehicle 8 includes two rail elements 15 in spaced-apart parallel relation, with each rail element 15 being configured as rectilinear running rail portion 15a. In the position of the transfer vehicle 8, shown in FIG. 2, the running rail marked 5a to the left of the corridor 9 and the running rail marked 5b to the right of the corridor 9 are in alignment with the leading running rail portion 15a to thereby realize a continuous running rail. Thus, a load-bearing member 1 can travel in this constellation under the power of its running gear 6 without interruption from the automated booth 12 to the flash-off chamber 14. Normally, the load 2 suspended from the load-bearing member 1 is moved or self-propels, however, from the automated booth 12 to the transfer vehicle 8 which then travels transversely to the running rails 5—i.e. downwards in the illustration of FIG. 2—for transfer of the load-bearing member 1 with the load 2, for example, to the running rail 5 of one of the manually-operated booths 13 or to a running rail 5 of the flash-off chamber 14. Reference numeral 24 designates doors which are open in areas where running rails 5 are located to provide access thereto.

It will be appreciated by persons skilled in the art that the transfer vehicle 8 contains additional mechanical apparatus which does not appear in the foregoing Figures, e.g. a drive unit to propel the transfer vehicle for travel along the rails 11 or a brake mechanism. Additionally, persons skilled in the art will understand that a suitable control mechanism must be provided to monitor the overall operation of the transport system, i.e. operation of the crane 7 and the transfer vehicle 8 as well as movement of the running gears 6 when the running rails 5 are aligned with the rail elements 15 of the crane 7 and/or the rail elements 15 of the transfer vehicle 8. However, these components have been omitted from the Figures for the sake of simplicity.

As further shown in FIG. 21 both rail elements 15 of the transfer vehicle 8 can be brought simultaneously in alignment with two successive running rails 15 of the right hand booth 14 to thereby enhance the versatility of the transfer vehicle 8, while only one of the rail elements 15 of the transfer vehicle 8 can be aligned with the running rails on the left hand side.

FIG. 3 shows a plan view of the upper production plane 4. The crane 7 is located in the mid-section of the overhead transport system and travels along parallel rails 16 which demarcate the corridor 9 and extend perpendicular to the running rails 5. The running rails 5 extend in parallel relation to the right of the corridor 9 in a compartment 17 which may be a kiln.

FIGS. 4 and 4a show, on an enlarged scale, cutaway views of the mid-section of the overhead transport system, illustrating in more detail the crane 7 and the transfer vehicle 8, respectively. As shown in FIG. 4, the rail element 15 of the crane 7 is mounted to the bottom side of a support beam 18 which extends parallel to the rail element 15 and provides an even support of the rail element 15 over its entire length. Further shown in FIG. 4 is the aligned connection of the rail element 15 and a running rail 5 in booth 17, to thereby allow a transfer of the load-bearing member 1 from the rail element 15 to the opposite running rail 5.

Figure 5:
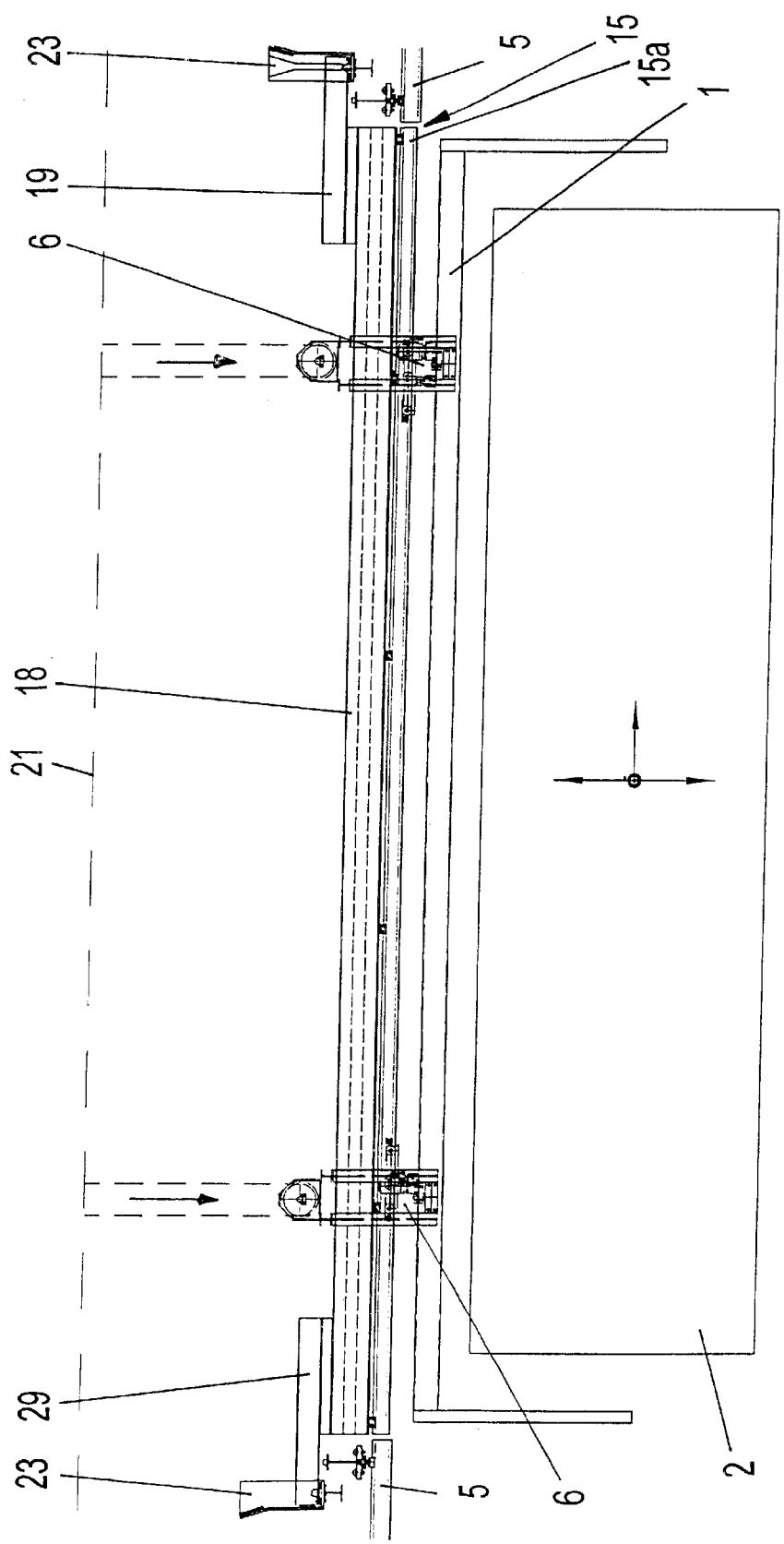
FIG. 5 is a schematic illustration of an overhead crane during transfer of a support beam from an upper production plane to a lower production plane.

The support beam 18 is formed on both ends with forked prolongations 19 which can be placed in receptacles 20 lined adjacent to the rails 16, as shown schematically in FIG. 3. Elevating and lowering of the support beam 18 is realized by the crane 7 via a lifting device 21, which is shown in FIG. 4 only schematically Via the, lifting device 21, the crane 7 can thus move the support beam 18 together with its rail element 15 in the upper production planes 4 into alignment with a desired running rail 5 for transfer of the respective load-bearing member 1. In addition, the lifting device 21 can lower the support beam 18 to the lower production plane 3 which is lined adjacent the rails 11 with stationary receptacles 23 to receive the support beam 18, as shown schematically in FIG. 5 which illustrates the phase during descent of the support beam 18 for placement in a respective one of the receptacles 23. As shown in FIG. 4a, the receptacles 23 have a funnel-shaped top to facilitate placement of the prolongations 19 when the support beam 18 is lowered by the crane 7. During descent, the prolongations 19 can fold inwardly to prevent interference with other parts. Thus, as indicated by arrow 25, the load-bearing members 1 can be shuttled by the crane 7 in the upper plane to the desired locations in the booth 17, and in addition can be dropped to a desired location in the lower production plane 3.

Figure 6:
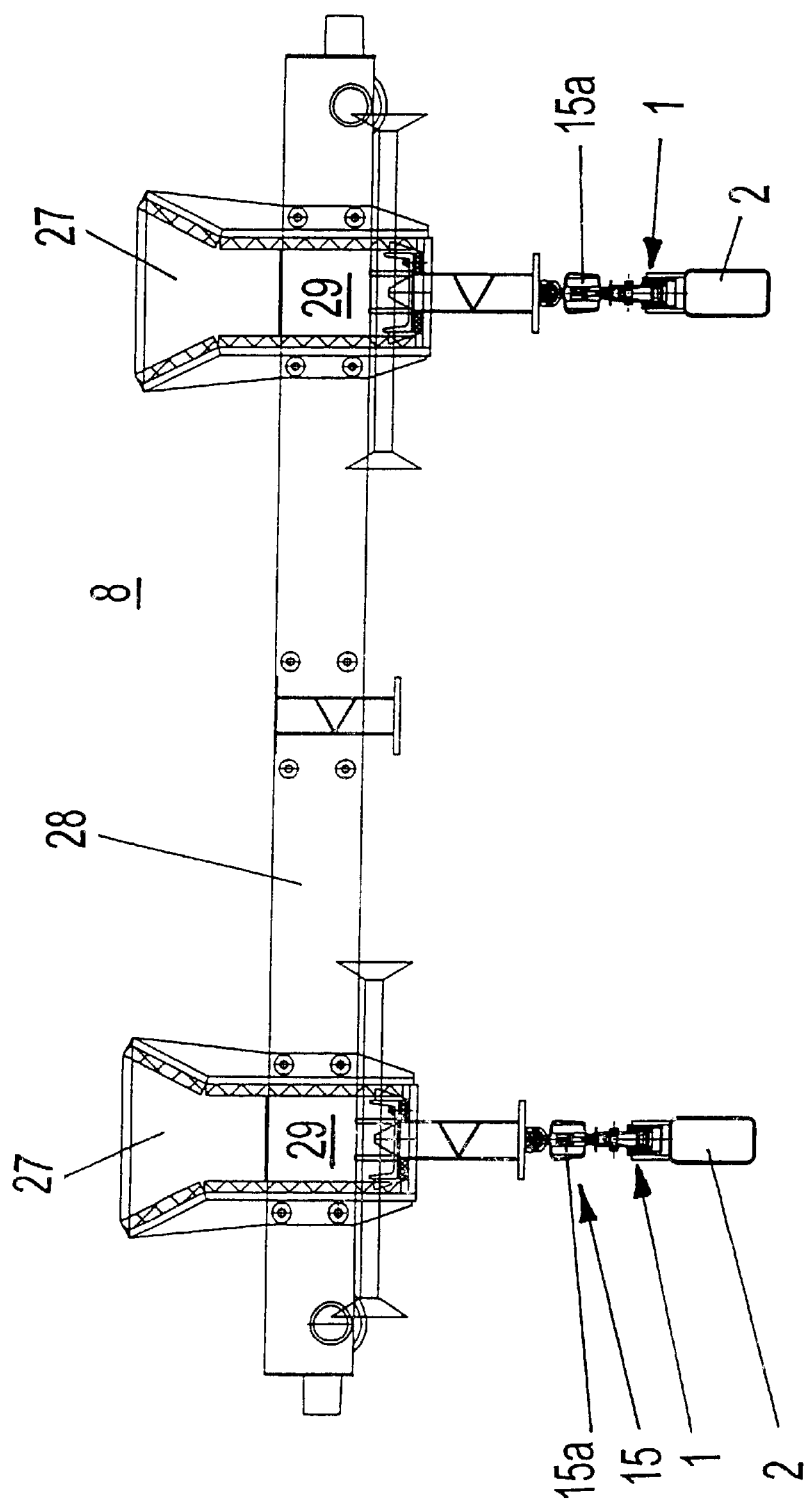
FIG. 6 is a schematic illustration of the transfer vehicle.

Transfer of load-bearing members 1 in the lower production plane 3 is, carried out by the transfer vehicle 8 which can run in a more rapid fashion than the crane 7. Clearly shown in FIG. 4a is the alignment of the rail elements 15 on opposite ends thereof with a respective running rail 5 to thereby allow a traveling of the load-bearing member 1 from one running rail 5 to the opposite running rail 5. As shown in FIGS. 4a, 6, the rail elements 15 of the transfer vehicle 8 are secured to a support beam 28 which is received on opposite sides via prolongations 29 in receptacles 24. The support beam 28, like the support 18 for the crane 7, provides even backing of the rail elements 15 during operation over their entire length. Thus, as indicated by arrow 26, in the lower production plane 3, the load-bearing members 1 can be selectively shuttled from a running rail 5 of one zone to a running rail of another zone.

While the invention has been illustrated and described as embodied in an overhead transport system, it is not intended to be limited to the details shown since various modifications and structural changes may be made without departing in any way from the spirit of the present invention.

What is claimed is:

1. An overhead transport system, comprising:

a first rail system located at an upper level, said first rail system including a plurality of parallel first horizontally positioned running rails and a plurality of horizontal crane rails positioned perpendicular to said first running rails, a second rail system located in a lower level in parallel, spaced-apart disposition to the first rail system, said second rail system including a plurality of parallel second running rails and a plurality of horizontal vehicle rails positioned perpendicular to said second running rails;

a plurality of load bearing members traveling on the running rails of each of the first and second rail systems;

a crane traveling on said crane rails in the upper level in a transverse direction to the running rails and including a support beam and a rail element securely mounted to an underside of the support beam and extending in parallel relationship to the support beam, said crane configured for moving the support beam horizontally in the upper level to align the support beam with the running rail in the upper level and vertically between said upper and lower levels to facilitate transfer of the load-bearing members onto said running rails in the second rail system;

a self-propelled transfer vehicle traveling on said vehicle rails in the lower level in a direction transversely to the second running rails, said transfer vehicle including rail elements and a support beam, said rail elements being mounted to an underside of the support beam; and a plurality of receptacles located in each of the upper and lower levels to receive opposite ends of a respective support beam, thereby establishing an alignment of a rail element on a support beam with a running rail of the first and second rail systems and allowing a transfer of the load-bearing members between the support beams and running rails.

2. The overhead transport system of claim 1 wherein the rail element is a running rail portion.

3. The overhead transport system of claim 2 wherein the running rail portion is rectilinear.

4. The overhead transport system of claim 1 wherein the transfer vehicle includes two rail elements in parallel, spaced-apart disposition.

5. The overhead transport system of claim 1 wherein the receptacles have a funnel-shaped configuration to facilitate placement of opposite ends of the support beam.

6. The overhead transport system of claim 1 wherein the load-bearing members are provided with running gears for permitting a self-propelling of the load-bearing members onto the rail elements.

7. The overhead transport system of claim 1 wherein at least one of the transfer vehicle and the crane travels in a corridor defining a longitudinal axis, with the running rails being arranged in at least one of the upper and lower levels on both sides of the corridor in a direction transversely to the longitudinal axis of the corridor.

* * * * *